J. B. REMMEN AND H. J. NICOLAI.
END THRUST DEVICE.
APPLICATION FILED JUNE 14, 1920.

1,402,180. Patented Jan. 3, 1922.

Inventors
H. J. Nicolai
and J. B. Remmen

Witness
H. Woodard

By H. B. Willson & Co.
Attorneys

UNITED STATES PATENT OFFICE.

JOHN BERNHARD REMMEN AND HENRY JULIUS NICOLAI, OF MONTEVIDEO, MINNESOTA.

END-THRUST DEVICE.

1,402,180. Specification of Letters Patent. Patented Jan. 3, 1922.

Application filed June 14, 1920. Serial No. 388,892.

*To all whom it may concern:*

Be it known that we, JOHN BERNHARD REMMEN and HENRY JULIUS NICOLAI, citizens of the United States, residing at Montevideo, in the county of Chippewa and State of Minnesota, have invented certain new and useful Improvements in End-Thrust Devices; and we do declare the following to be a full, clear, and exact description of the invention, such as will enable others skilled in the art to which it appertains to make and use the same.

This invention relates to an improved end thrust device and method of making same, and it has more particular reference to a device of this class which is especially, although not necessarily, designed for use on Ford automobiles and tractors.

A careful study of automobiles and tractors of this make has enabled us to learn that the reason for the ignition being defective at times resides in the fact that the crank shaft, which carries the magnets, wears its bearings, especially the rear one, to such an extent that the shaft is permitted to move rearwardly and carry the magnets away from the coils, thus destroying much of the power of the magneto.

Because of the above circumstances we have devised means to prevent such endwise movement of the crank shaft of a new machine and restore the crank shaft of an old machine to its original place. What we intend to do is to interpose a ball carrying member and a washer if necessary, between the front crank shaft bearing and the fan belt pulley, which construction will retain the crank shaft in its proper position.

In carrying out the foregoing idea we have devised a specially constructed end thrust device and intend to follow a novel method in making the same.

Other objects and advantages of the invention will be apparent from the foregoing description.

In the accompanying drawings forming a part of this specification and in which like numerals are employed to designate like parts throughout the same:

Figure 1:
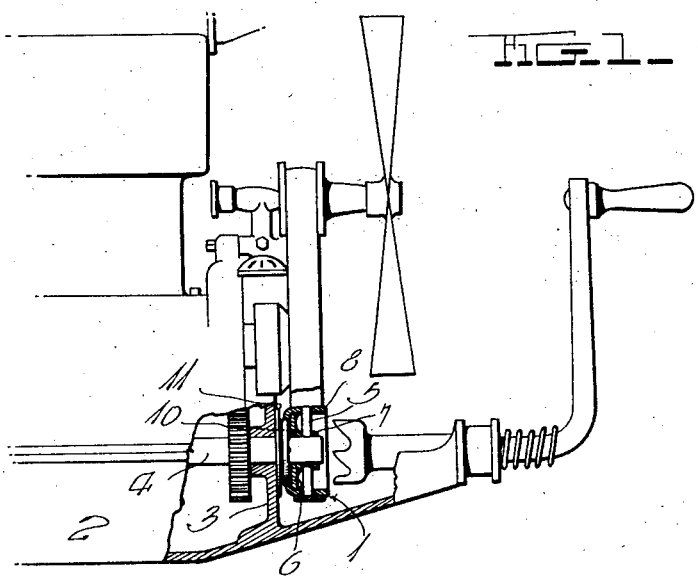
Fig. 1 is an elevation of a device constructed in accordance with our invention, the same being shown in position.
Figures 2, 3:
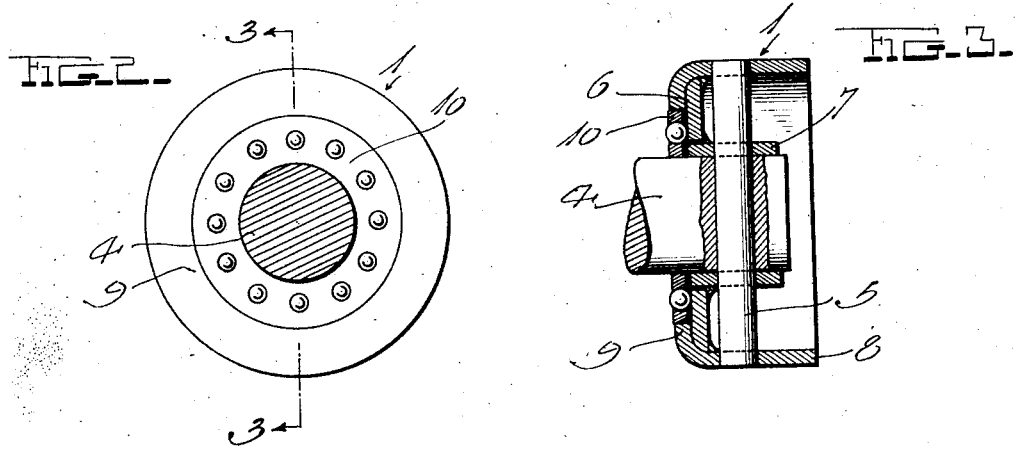
Fig. 2 is an enlarged detail view of a fan belt pulley reconstructed to accord with our invention.
Fig. 3 is a section taken on the line 3—3 of Fig. 2, looking in the direction of the arrows.
Figure 4:
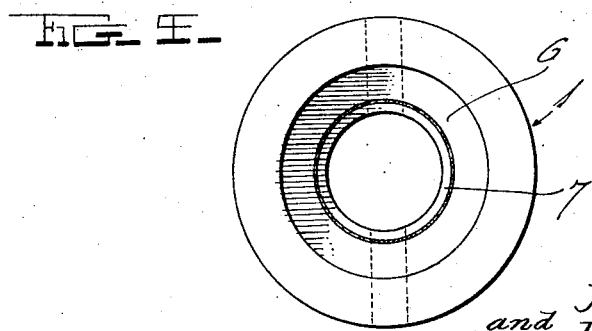
Fig. 4 is a view similar to Fig. 2 but showing the ball carrying ring removed and exposing the hard metal bearing washer which we install in the pulley.

In carrying out our invention we make use of the usual Ford fan belt pulley so that it will not be necessary to discard the same. This pulley is here designated by the numeral 1. To enable the reader to obtain a thorough understanding of the invention and the manner in which it is used, we have shown parts of the engine in Fig. 1. By referring to this figure it will be seen that the numeral 2 indicates the crank case which carries a bearing 3 in which the crank shaft 4 is journaled. The latter extends forwardly from the bearing, and it is on this part of the shaft that the fan belt pulley is secured by means of the retaining pin 5. These and other parts shown are of the well known construction and while they all do not affect our device we deem it advisable to illustrate them partially.

In carrying out the invention we employ the usual type of pulley 1, as has been before indicated. It will be recalled that this pulley is made of cast metal which would not be effective if used with our device, but we do not want to discard the old pulley, so we take a hard metal washer 6 and slip it over the hub 7 and position it between this hub and the rim 8 and force it into tight contact with the rim and hub connecting portion 9 of the pulley. Having done this, we secure it in this position by brazing or by other suitable means. It then becomes a permanent part of the pulley. The latter is then put onto a lathe and the original rim and flange connecting portion 9 is reamed or otherwise cut away to such an extent that the washer 6 is exposed. This construction provides a recess, the bottom of which is of wear resisting material.

A ball bearing carrying member 10 is adapted to be seated in this recess. This member may be of any suitable construction, being here shown in the form of an apertured ring. When the device is in use we will place one or more hard metal washers 11 between the bearing 3 and the pulley to take up space and force the shaft 4 forward to its proper position and also to provide a proper bearing for the balls of the member 10.

With the foregoing construction it will be seen that we are able to take an old pulley off, reconstruct it in the manner set forth, place a ball carrying ring in the recess and put the pulley back in place. With a pulley constructed in accordance with this invention it will be seen that the washer 6 supports the hub and forms a solid bearing for the ball bearings carried by the member 10.

In use, one or more washers 11 are placed on the crank shaft 4 so as to rest against the front crank shaft bearing 3. The pulley after being reconstructed to accord with our invention is then replaced. After this is done the crank shaft will be drawn forward to its original position and further endwise movement thereof prevented, thus insuring that the magnets and coils are in proper spaced relation to obtain the best possible results from the magnets.

A device constructed in accordance with our invention will be found highly effective and practical. It may be readily installed, it of course being understood that it will be necessary to remove the radiator to do so. We have perfected and tried this invention out and can safely say that it brings about results far beyond expectations. The device is strong, durable, and inexpensive; and due to its practicability it will appeal to Ford owners.

A careful consideration of the foregoing description taken in connection with the accompanying drawings will enable persons skilled in this line of business to obtain a thorough understanding of the same, therefore, further description is deemed unnecessary.

It is to be understood that the form of this invention herein shown and described is to be taken as a preferred form of the same, and that various changes in the shape, size, and arrangement of parts may be resorted to without departing from the spirit of the invention or the scope of the subjoined claims.

We claim:

1. A device of the class described comprising a fan belt pulley including a hub and a rim, a washer of wear resisting material secured in said pulley between the hub and rim, the hub and rim connecting portion of the pulley being cut out, exposing the washer and forming a recess, and a ball carrying ring to be seated in said recess.

2. A fan belt pulley comprising an outer rim for the belt to ride on, said rim having one end inturned to provide a lateral annular stop flange, a sleeve within said rim constituting a hub to fit on the crank shaft, a hard metal washer arranged in and secured to said rim and bearing against said flange, forming a recess, the adjacent end of said sleeve extending into the central opening of the washer and being secured thereto to form a complete pulley, and a ball bearing carrier-ring seated in said recess.

In testimony whereof we have hereunto set our hands.

JOHN BERNHARD REMMEN.
HENRY JULIUS NICOLAI.